Feb. 3, 1970 C. H. FAGER 3,492,977
INTERNAL COMBUSTION ENGINE
Filed Oct. 19, 1967 3 Sheets-Sheet 2

INVENTOR.
CHARLES H. FAGER
BY Watts, Hoffmann,
Fisher & Heinke
ATTORNEYS

Feb. 3, 1970  C. H. FAGER  3,492,977
INTERNAL COMBUSTION ENGINE
Filed Oct. 19, 1967  3 Sheets-Sheet 3

INVENTOR.
CHARLES H. FAGER
BY *Watts, Hoffmann,
Fisher & Heinke*
ATTORNEYS

United States Patent Office 3,492,977
Patented Feb. 3, 1970

3,492,977
INTERNAL COMBUSTION ENGINE
Charles H. Fager, Gates Mills, Ohio, assignor to White Motor Corporation, Cleveland, Ohio, a corporation of Ohio
Filed Oct. 19, 1967, Ser. No. 676,421
Int. Cl. F01p 3/16; F02b 23/00
U.S. Cl. 123—41.32          5 Claims

ABSTRACT OF THE DISCLOSURE

A V-block spark ignition gasoline engine with an improved electrical ignition system and an improved combustion chamber. Each combustion chamber of the engine is provided with two intake and two exhaust valves which are disposed in a generally square arrangement with a spark plug extending through an opening into the combustion chamber in the center of the square formed by the valves. A heat conductive sleeve surrounds the spark plug and transfers heat away from the spark plug to engine coolant surrounding the sleeve. The spark plug includes electrodes which extend into a dish-shaped cavity formed in the piston of the combustion chamber.

CROSS-REFERENCED APPLICATIONS

Application for U.S. Letters Patent Ser. No. 674,228, filed Oct. 10, 1967 by F. S. Baster, entitled "Internal Combustion Engine Manifold."

BACKGROUND OF THE INVENTION

Field of the invention

The present invention relates to internal combustion engines and more particularly relates to internal combustion engines of the spark ignition type suitable for use in over-the-highway trucks.

Prior art

Diesel engines and gasoline fuel spark ignition engines are commonly used to propel over-the-highway trucks or similar vehicles. Since diesel engines rely on compression of a fuel and air mixture to ignite the mixture, such engines operate at relatively high compression ratios. Accordingly, diesel engines are constructed of relatively heavy-duty components to accommodate pressure forces which are encountered during combustion. Diesel engine assemblies include fuel injection equipment, fuel filters, etc., and consequently a diesel engine assembly is generally relatively heavy and large in comparison to a gasoline engine.

Gasoline engines, when compared to diesel engines, have the advantages of better starting in cold weather and utilize much lower compression ratios due to the fact that the fuel and air mixture in a compustion chamber of the gasoline engine is ignited by an electrical spark. As a consequence of the relatively low compression ratios utilized in gasoline engines, such engines are generally relatively light and small and have a lower initial cost to the user. The lightness of the spark ignition engine provides for increased payload of a truck propelled by such an engine.

Generally, diesel engines have been preferred for over-the-highway tractors because:
(1) The fuel is relatively less expensive;
(2) The high torque which is generated by the engines; and
(3) Their reliability.

SUMMARY OF THE INVENTION

The present invention is directed to a spark ignition engine which:

(1) Develops high torque equal to or better than diesel engines of comparable horsepower; and,
(2) Has high efficiency and reliability.

In accordance with the present invention, a spark ignition gasoline fuel engine for an over-the-road vehicle, such as a truck, is provided which has the diesel features of heavy-duty components including cylinder block, cylinder heads, crankshaft, and connecting rods and a four valve combustion chamber of the "diesel" type. With the improved ignition and combustion chamber, the engine has relatively long life, low maintenance costs and fuel economy. The engine also exhibits the favorable spark ignition engine features of relatively light weight, small size, low compression ratios and reliable cold weather starting.

An electrical ignition system is provided in which the spark plugs for the individual cylinders are housed in highly conductive metallic sleeves. The sleeves are disposed in direct contact with the coolant defining portions of coolant passages of the engine so that heat is transferred away from the spark plugs. This results in increased spark plug life and reduces the need for frequent cleaning and "gapping" of the plugs. The cooling of the plugs also minimizes the possibility of detonation or pre-ignition.

The spark plug is positioned centrally of the four valve combustion chamber and along the axis of the cylinder. The piston includes a dish-shaped cavity in its upper side, which cavity along with a flat cylinder head defines the combustion chamber. The sprak plug is centered in the cavity and burning occurs generally symmetrically through the combustion chamber when a spark ignites the fuel. Thus, for the first time, the spark plug of an internal combustion chamber is positioned along the axis of the cylinder in an engine in which the piston has the chamber defining cavity.

Accordingly, a principal object of the invention is the provision of a new and improved engine constructed to provide a spark ignition engine having heavy duty components and corresponding low maintenance costs of diesels, improved fuel economy, and high reliability.

Other novel advantageous features of the present invention will become apparent from a consideration of the following detailed description thereof made with reference to the accompanying drawings.

THE PREFERRED EMBODIMENT

Figure 1:
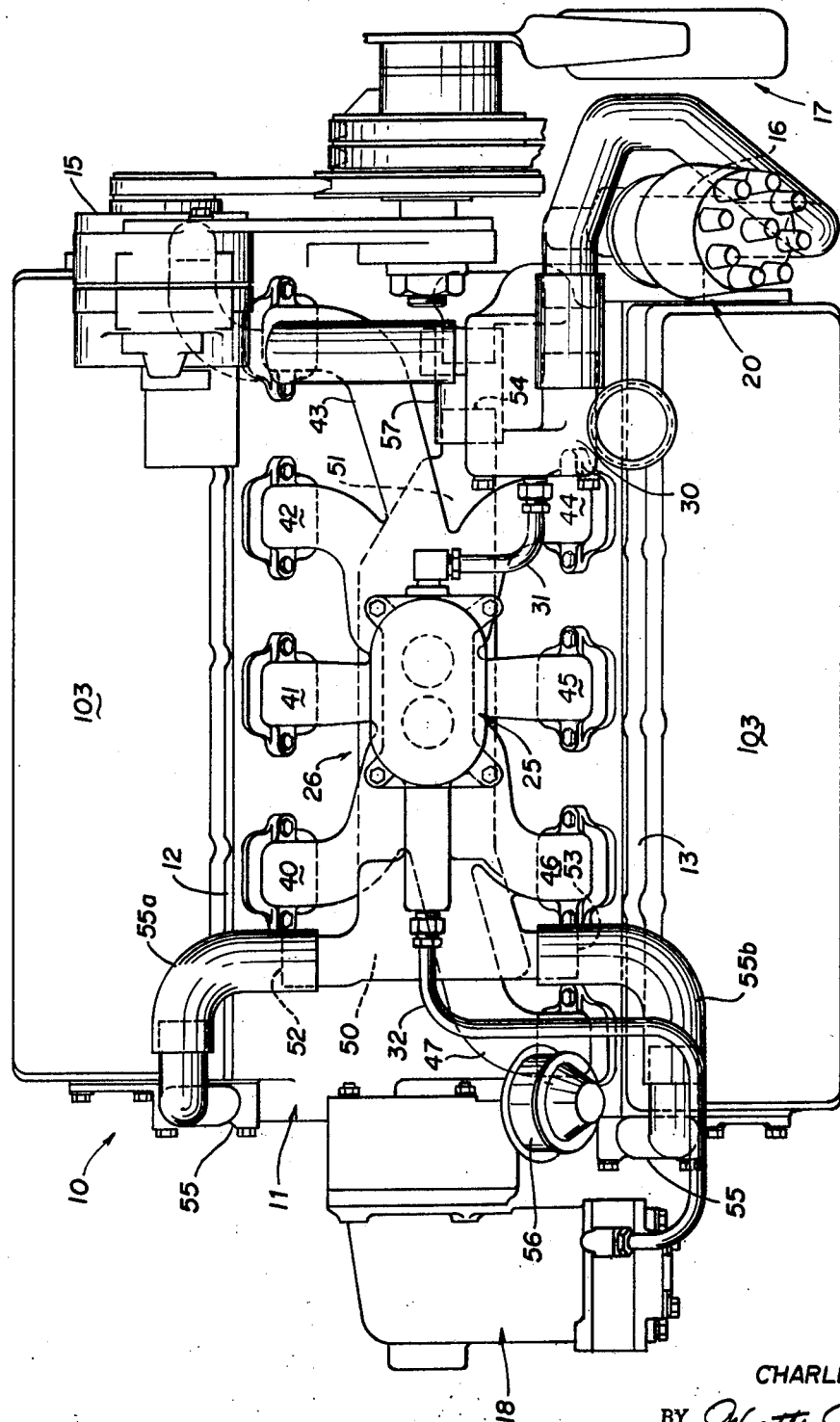
FIGURE 1 is a top plan view of an engine embodying the present invention.

An engine 10 embodying the present invention is illustrated in FIGURE 1 and includes a block 11. The block 11 supports a crankcase (not illustrated) communicating with two rows of cylinders which are bored along axes lying in planes which converge in the crankcase. Thus, the block 11 is of the type which is commonly referred to as a V block. The cylinders in the block 11 are closed by cylinder heads 12, 13 which are described in detail presently.

The cylinders contain pistons which are operative to rotate a crankshaft of the engine 10 which, in the case of an over-the-road vehicle, is linked to a propeller shaft and wheels of the vehicle by a suitable transmission, driveshaft and differential which are not illustrated. The crankshaft additionally drives auxiliary equipment associated with the engine which equipment is schematically shown as including an alternator 15, a water pump 16, and a cooling fan generally indicated at 17, all suitably connected to the crankshaft by way of driving belts and pulleys. The engine additionally drives an air compressor 18 and the rotor of a distributor 20. The distributor 20 is conventionally connected electrically with individual spark plugs in the cylinders of the engine so that electrical arcs are provided at the gaps of the spark plugs at appropriate times during the cycle of operation of the engine.

The water pump 16 provides a flow of cooling fluid through passageways which are formed in the engine block and cylinder heads and which conduct coolant through the block and cylinder heads for transferring heat away from the combustion chambers. The heated coolant is then directed through a conventional radiator (not shown) and returned to the intake of the water pump 16.

Air and fuel are supplied to the engine through a fuel distributing system including a two-barrel down-draft carburetor not shown, which is normally mounted on a riser 25. The riser 25 is mounted on intake manifold structure generally designated at 26. The manifold 26 is located beneath the riser 25 and communicable with the carburetor and with the combustion chambers of the engine. The manifold 26 is described in greater detail in the above-referenced Baster application.

As illustrated in FIGURE 1, the riser 25 is provided with internal passages for circulating heated engine coolant. Coolant from the compressor 18 passes through a tube 32 to the riser 25 to heat the riser and carburetor under certain conditions and to prevent carburetor icing. A riser outlet is connected to thermostat housing 30 by a riser return tube 32.

Figure 3:
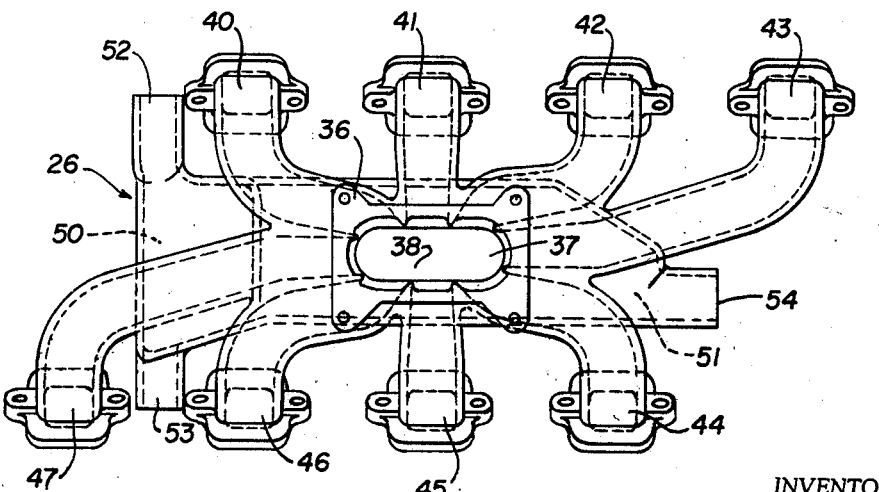
FIGURE 3 is a plan view of an intake manifold structure forming a part of the engine of FIGURE 1.

The manifold 26 (see FIGURE 3) is preferably a casting of suitable material such as cast iron and includes a central body portion having a flange 36 integrally formed at its upper side for connection with the carburetor 25 by suitable screws (not shown). The body defines a single, central chamber 37 located directly below the barrels of the carburetor 25 for receiving the fuel and air mixture from the carburetor. The chamber 37 communicates with the combustion chambers of the engine through conduits 40–47 defining passageways which open into the chamber 37. The conduits 40–47 are generally rectangular in cross section and they extend generally radially from the chamber 37 to the cylinder heads 12, 13. With this construction the fuel and air mixture provided by the carburetor 25 to the chamber 37 is distributed without substantial change in the fuel-air ratio to each of the combustion chambers of the engine. Such structure minimizes "hot spots" which might otherwise be caused by too "lean" or too "rich" a mixture being provided in certain of the combustion chambers.

The conduits 40–47 are continuous with the body 35 and converge into the chamber 37 so that the side walls of adjacent conduits are common adjacent the chamber 37. The conduits 40–42 and 46–44 are substantially symmetrical about the longitudinal axis of the chamber 37, while the conduits 43, 47 extend in opposite directions from ends of the chambers to intake valves of the combustion chambers remote from the carburetor. The chamber 37 includes a recessed portion 38 at its lower side.

The simplicity of the manifold construction, as compared with the prior art results in more consistent production of high-quality manifolds. It is believed that one reason this is true is that with conventional sand-casting techniques fewer internal flaws occur with a resultant reduction in turbulence in the flow of the fuel-air mixture. Moreover, all of the conduits 40–47 have minimal, gradual bends deflecting the fuel-air mixture less than 90° in each case, thereby minimizing turbulence caused by relatively tortuous prior intake manifold passages.

The manifold structure 26 additionally includes coolant chambers with inlet and outlet portions 50, 51 formed at opposite ends of the manifold body 36. The coolant chamber portions 50, 51 are provided with inlet ports 52, 53 and an outlet port 54 which provide suitable connections with the cooling system. Inlet ports 52, 53 are connected to head outlets 55 by hoses 55a, 55b respectively. The outlet port 54 is connected to the thermostat housing 30 by an outlet hose 57.

The conduits 40–47 of the intake manifold structure 26 each include a flange 60 at their ends remote from the chamber 37 and which flanges 60 are suitably fastened to flanges 60a formed on the cylinder heads 12, 13.

The cylinder heads 12, 13 are formed by a suitable metal casting, preferably cast iron, and define intake passageways 61 communicating the intake manifold structure 26 with the combustion chambers, exhaust passageways for directing combustion products from the combustion chambers to an exhaust manifold for the engine (not shown), and the coolant passageways referred to previously for cooling the cylinder heads. The combustible mixture from the intake manifold structure 26 is directed into the combustion chambers of the engine through the intake passageways 61 in the cylinder heads 12, 13.

Figures 5, 6:
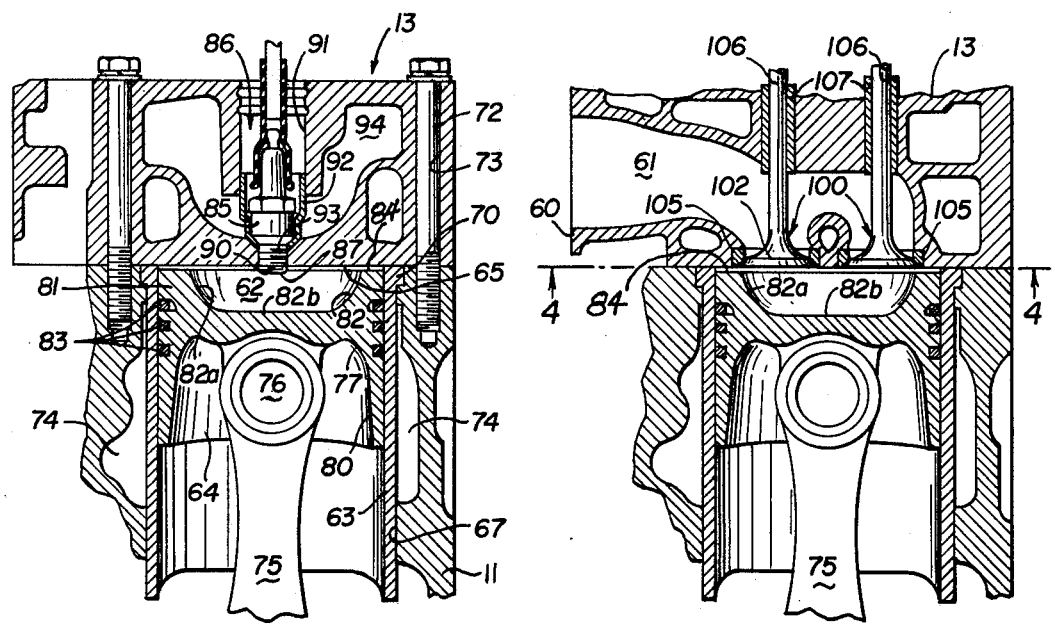
FIGURES 5 and 6 are vertical sectional views of combustion chambers of the engine of FIGURE 2 viewed from planes indicated by the lines 5—5 and 6—6 of FIGURE 4.

A typical combustion chamber 62 of the engine 10 is illustrated in FIGURES 5 and 6. The combustion chamber 62 is formed by cylinder 63 in the block 11, a piston 64, and a planar surface 65 of the cylinder head 13 which closes the end of the cylinder 63. More particularly, the cylinder 63 is formed by a sleeve 66 which is inserted in an opening 67 in the block 11. The sleeve 66 is anchored in the block by a flange 70 about its upper end which is engaged with a flange 71 formed in the block 11 to prevent movement at sleeve 66 toward the crankcase. The uppermost surface of the sleeve 66 is engaged by the planar surface 65 of the head 13 and the head 13 is maintained in firm engagement with the sleeve 66 by bolts 72 which extend through opening 73 in the head and which are threaded into the block 11. The outer periphery of the sleeve 66 and adjacent wall of the block 11 define coolant passageways 74 about the cylinder so that engine coolant circulating through the passageways 74 provides heat transfer from the cylinders.

The piston 64 is connected to the crankshaft of the engine by a connecting rod 75 and a pin 76, and includes a generally cylindrical body 77 defined by a skirt 80 and an end portion 81. The end portion 81 defines a generally dish shaped cavity 82 of a smaller diametrical extent than the diametrical extent of the piston 64. The body 77 of the piston 64 is also provided with circumferential grooves for receiving the usual oil and compression rings 83.

The cavity 82 includes a curved side wall 82a which merges smoothly into a relatively small circular planar surface 82b located on the axis of the piston 64. The design of the chamber 82 allows even and complete burning of regular grade gasoline in the combustion chamber 62. It has been discovered that a hemispherical chamber in the piston produces very poor results in the form of pre-ignition. The results from failure to cool the so-called "end gases" from one ignition adequately before fuel is introduced into the chamber for a subsequent ignition. To overcome pre-ignition it is essential to have a piston surface at 84 to cool the end gases. This surface, 84, known as the quench area, is the planar piston surface surrounding the combustion cavity 82 and is at least about 45% to 50% of the total cross-sectional area of the piston.

If the piston has adequate quench area it is not possible to have a hemispherical chamber of sufficient volume without excessively lengthening the piston. Moreover, this engine operates smoothly and efficiently on low octane fuels as contrasted with hemispherical chambers in a head or piston which require high octane fuels.

When the piston 64 is in its top dead-center position, which is illustrated in FIGURES 5 and 6, the combustion chamber is formed by the cavity 82 in the piston 64, and the surface 65 of the head 13. Combustion is initiated in the combustion chamber by a spark plug 85 fixed in an opening 86 extending through the cylinder head 13 along the axis of the cylinder 63 so that electrodes 87, 90 of the spark plug 85 are centered in the combustion chamber. When the spark plug initiates combustion in the chamber the fuel is burned along a curved flame front which proceeds toward the cavity 82 in the piston 64 and produces a resultant downwardly directed pressure force on the piston which is directed substantially through the axis of the pin 76 and which pressure acts upon the piston uniformly due to the configuration of the cavity 82. In the preferred embodiment, the construction of the piston is such that an eight to one compression ratio is provided in the combustion chamber 62 and a brake mean effective pressure of approximately 130 p.s.i. is produced, utilizing a regular grade of gasoline.

The spark plug opening 86 is defined by a bore 91 in the head 13, and a sleeve 92 which is preferably copper or other suitable material having relatively high specific heat conductivity. The sleeve 92 is tightly engaged with the bore 91 adjacent its upper end. The opening 86 is additionally defined by a threaded hole 93 opening into the combustion chamber 62 and which hole has a countersunk portion at its upper end. The spark plug 85 is inserted in the bore 91 and screwed into the hole 93 so that a lower end of the sleeve 92 is tightly engaged between a tapered surface on the spark plug and the counter-sunk portion of the hole 93.

As is best seen in FIGURE 5, a coolant passage 94 surrounds the sleeve 92 and due to the heat conducting properties of the sleeve 92, the coolant flow through the passageway 94 transfers heat from the spark plug 85. This has the effect of reducing the tendency of the electrodes 87, 90 to be burned or fouled. The tight fit between the sleeve 92 and the bore 91 and the counter-sunk portion of the hole 93 seals the spark plug 85 from the coolant in the passageway 94.

Figure 2:
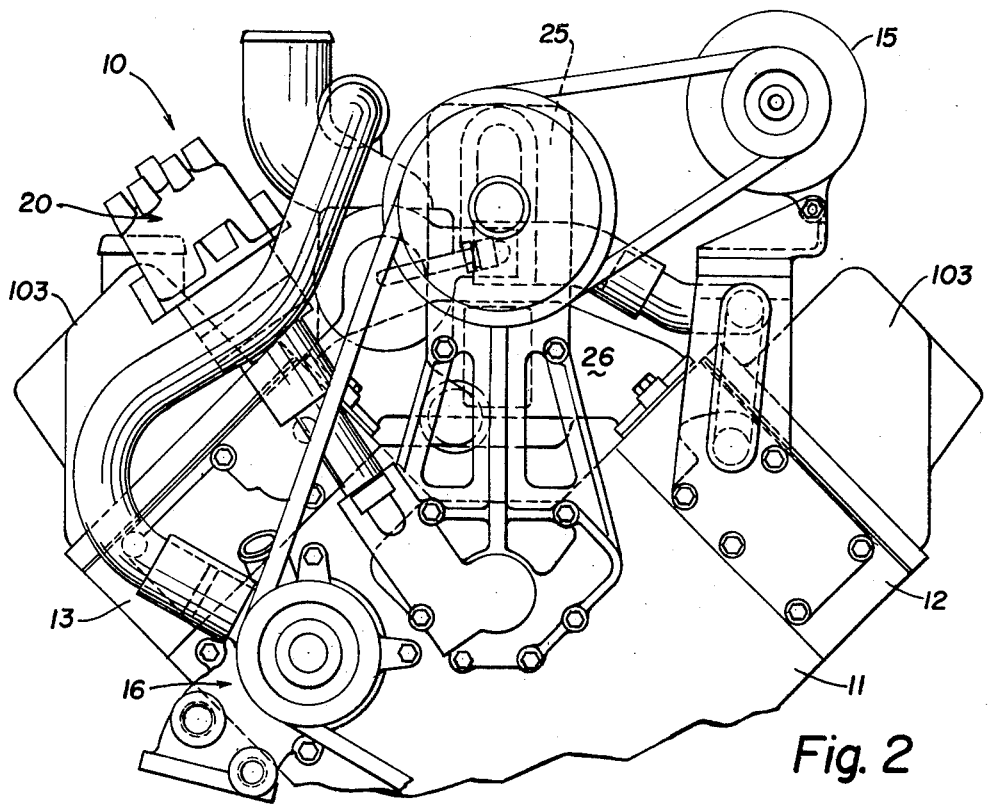
FIGURE 2 is a front elevational view of the engine of FIGURE 1.
Figure 4:
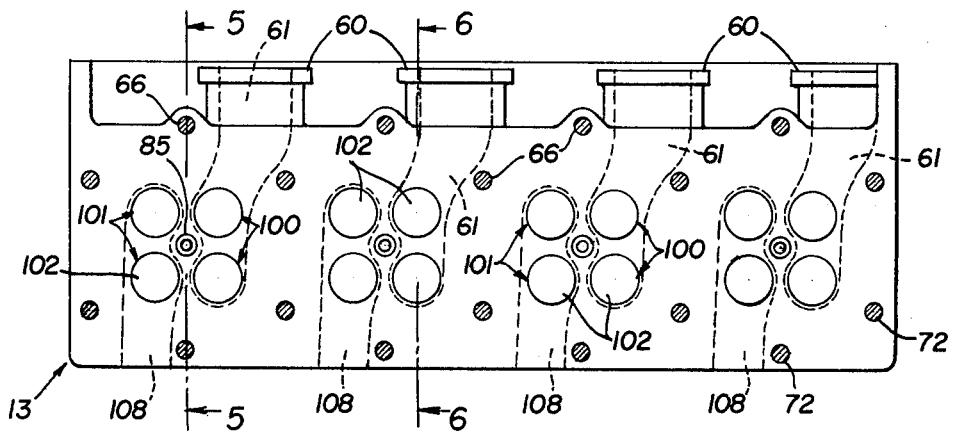
FIGURE 4 is a plan view of a cylinder head of the engine of FIGURE 2 viewed from the plane indicated by the line 4—4 of FIGURE 6 on a scale which is smaller than the scale of FIGURE 6.

The engine 10 is of the valve-in-head type and each combustion chamber 62 is provided with two coacting inlet valves 100 and two coacting exhaust valves 101 (see FIGURE 4). The valves 100, 101 are of the poppet type and are substantially identical in construction with the valves each including a generally circular valve member 102 and a stem portion 103 extending upwardly through the cylinder head 13 to a valve operating mechanism which has not been illustrated. The valve operating mechanism is of conventional construction which is lubricated from the crankcase and covered by members 103, which contain the lubricating oil and protect the mechanism (see FIGURES 1 and 2). The valves 100, 101 are disposed in a "square" arrangement and with the cylinders 63 with the spark plug 85 extending through the surface 65 of the head 13 at the center of the square defined by the valves 100, 101.

As best seen in FIGURE 6, the valve members 102 cooperate with hardened annular inserts 105 disposed in the surface 65 of the head 13 in which inserts 105 provide seats for the valves 100, 101. When the valves 100, 101 are in a closed position, planar surfaces 102a of the members 102 are disposed substantially in the plane of the surface 65 of the cylinder heads to define a portion of the combustion chambers 62. FIGURE 6 illustrates the intake valves 100 in their relation to the combustion chamber and the stems 106 of the valves 100 extend to the valve operating mechanism through bushings 107 fixed in the cylinder head 13. The intake passage 61 surrounds the valves 100 and when the valves are open during an intake downstroke of the piston 64, the fuel-air mixture is directed between the valve members 102 and the seats 105 and introduced into the combustion chamber.

Due to the fact that a pair of intake valves 100 are provided in each of the cylinders, the flow of fuel and air into the chamber is substantially unimpeded and accordingly the dual intake valve structure provides for a relatively high volumetric efficiency of the engine 10. After the compression and power strokes of the piston 64 the exhaust valves 101 are opened in the same manner as the intake valves and the combustion products are directed to the exhaust manifolds through the exhaust passageways 108 formed in the cylinder heads.

While a single embodiment of the present invention has been illustrated and described in considerable detail, the invention is not to be considered to be limited to the precise construction disclosed. It is the intention to cover hereby all adaptations, modifications, and uses of the present invention which come within the scope of the appended claims.

What is claimed is:
1. In a spark ignition internal combustion engine:
 (a) a cylinder block;
 (b) pistons disposed in said block;
 (c) at least a cylinder head fixed to said block;
 (d) said block, pistons and cylinder head defining combustion chambers;
 (e) said cylinder head defining intake passageways, exhaust passageways and engine liquid coolant passageways, and openings between each of said intake, exhaust and coolant passageways and said combustion chambers;
 (f) intake and exhaust valve members supported by said cylinder head and movable to establish and interrupt communication between said intake and exhaust passageways and said combustion chambers through the openings in the intake and exhaust passageways;
 (g) spark plugs having electrodes extending through the openings communicating with said coolant passageway and into said combustion chamber near the axis of said cylinders;
 (h) each spark plug threaded into one of said openings and extending through said engine coolant passageway;
 (i) a relatively thin sleeve of material having a high heat conductivity surrounding each of said spark plugs, said sleeve having a generally tubular body portion extending through said coolant passageway in heat transfer relationship with engine coolant and a flange-like terminal portion compressively engaged between said spark plug and a portion of said cylinder head surrounding said opening, a substantial portion of said tubular sleeve surrounding and spaced from said spark plug; and
 (j) said terminal portion of said sleeve, said spark plug, and said head sealingly engaged with each other, and said spark plug and at least said terminal portion of said sleeve in conductive heat transfer engagement to establish heat transfer from said spark plug to engine coolant in said coolant passageway.

2. An engine as claimed in claim 1 wherein said spark plugs are supported in said cylinder head with their electrodes substantially on the axes of the associated cylinders; each of said pistons including a face having a generally planar annular face portion and a second face portion defined by a dish-shaped cavity surrounded by said first face portion, said first face portion comprising at least about 45% to 50% of the cross-sectional area of the piston, and, said first portion of said piston face and opposed surface of said cylinder head defining boundaries of a quench volume and effective to transfer heat away from the mixture in said quench volume as combustion occurs in said combustion chambers.

3. An engine as claimed in claim 1 and having a pair of intake and exhaust valves in each combustion chamber, said valves of the poppet type having a planar surface disposed substantially in the plane of an end surface of each combustion chamber defined by said cylinder head when in a closed position, said intake and exhaust valves disposed in a generally square arrangement with said spark plug supported substantially at the center of said square formed by said valves and extending into said combustion chamber along the axis of said cylinder structure.

4. The engine of claim 1 wherein the sleeve is comprised of copper.

5. The engine of claim 4 wherein the head is cast iron.

References Cited

UNITED STATES PATENTS

| 1,692,385 | 11/1928 | Royce | 123—41.32 |
| 1,962,078 | 6/1934 | Kegresse | 123—41.32 XR |
| 2,148,702 | 2/1939 | MacClatchie | 123—41.32 |
| 2,749,900 | 6/1956 | Mitchell | 123—191 |
| 3,045,655 | 6/1962 | Formia. | |
| 3,150,654 | 9/1964 | Robison | 123—191 |

WENDELL E. BURNS, Primary Examiner

U.S. Cl. X.R.

123—52, 55, 75, 188, 191, 193